Figure 1:
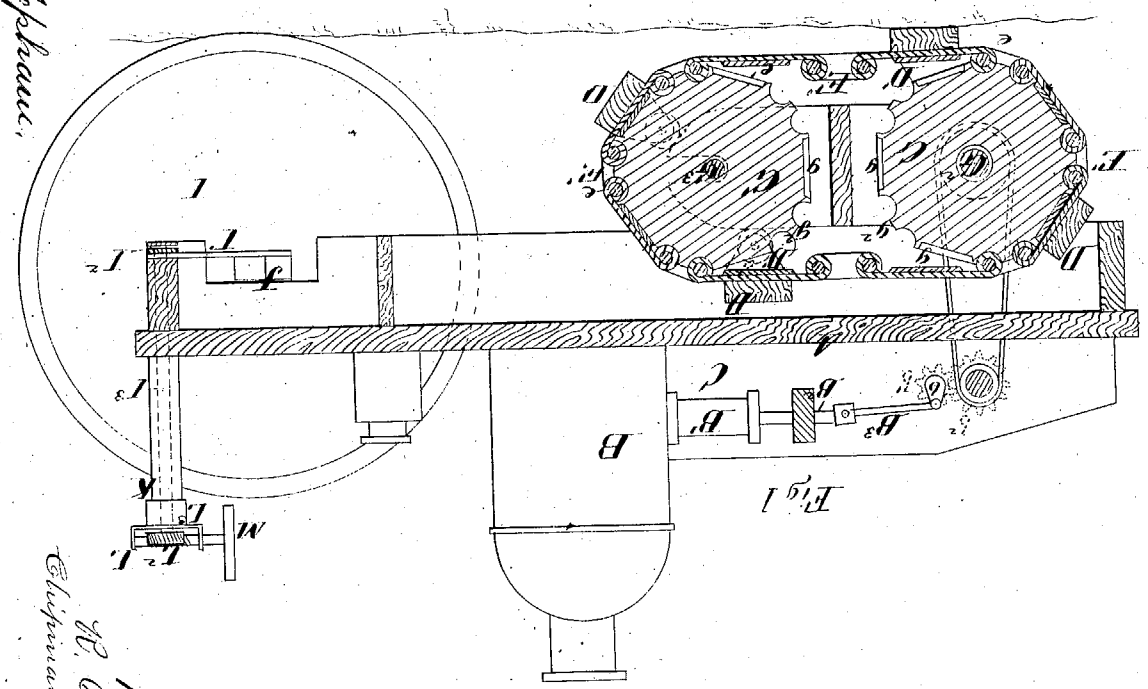
Figure 2:
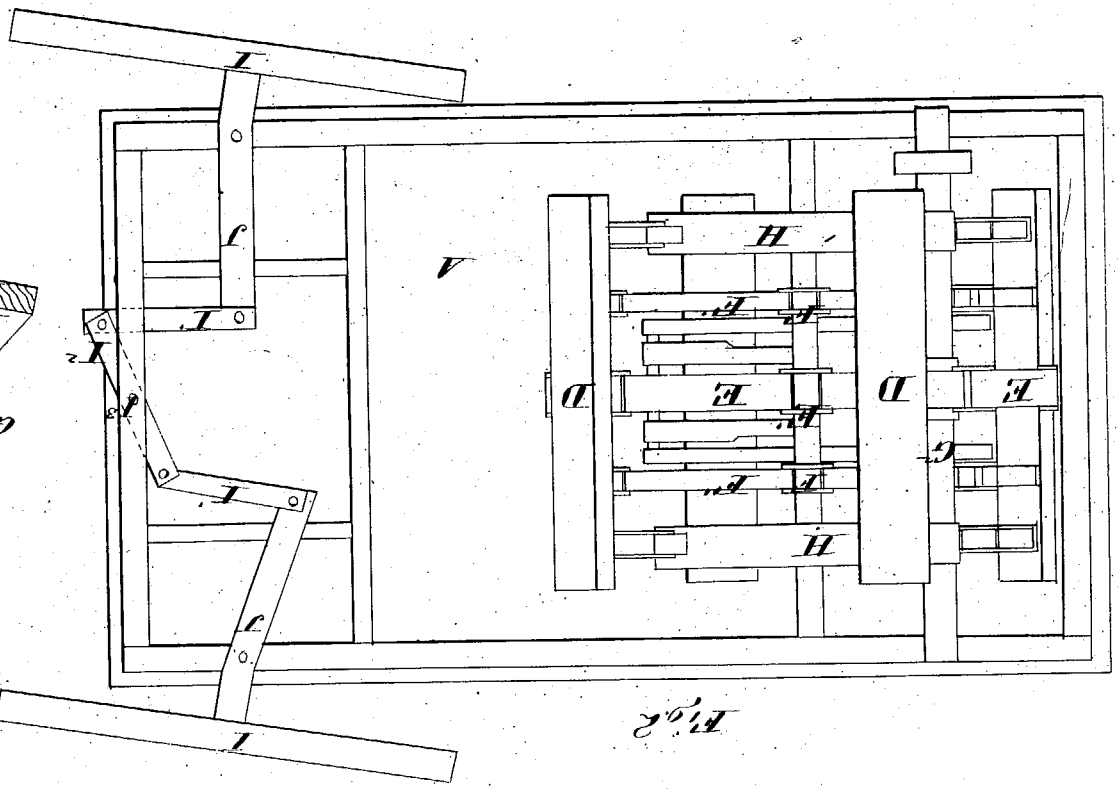
Figure 3:
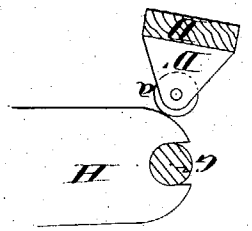

2 Sheets--Sheet 1.

R. C. PARVIN.

Improvement in Traction Engines.

No. 4,753.

Reissued Feb. 13, 1872.

Witnesses
J. A. Mudly
Geo E. Upham.

Inventor
R. C. Parvin,
Chipman & Somner & Co.
Attys.

2 Sheets--Sheet 2.

R. C. PARVIN.

Improvement in Traction Engines.

No. 4,753. Reissued Feb. 13, 1872.

Witnesses
J. Alexander
Geo. E. Upham.

Inventor
R. C. Parvin,
Chipman Fosmer & Co
Attys

UNITED STATES PATENT OFFICE.

ROBERT C. PARVIN, OF PHILADELPHIA, PENNSYLVANIA.

IMPROVEMENT IN TRACTION-ENGINES.

Specification forming part of Letters Patent No. 119,878, dated October 10, 1871; reissue No. 4,753, dated February 13, 1872.

*To all whom it may concern:*

Be it known that I, ROBERT C. PARVIN, of Philadelphia, in the county of Philadelphia and State of Pennsylvania, have invented a new and valuable Improvement in Traction-Engines; and I do hereby declare that the following is a full, clear, and exact description of the construction and operation of the same, reference being had to the annexed drawing making a part of this specification and to the letters and figures of reference marked thereon.

My invention has reference to traction-engines or land-carriages designed for use on common roads and for aiding the operations of husbandry. It relates to that class of land-carriages in which the propulsion is accomplished by means of a traction-band or endless carrier made with feet which cross a central longitudinal line of the carriage; and the novelty consists in the peculiar construction, arrangement, and adaptation of parts, as hereinafter fully described.

It has heretofore been customary in the class of carriages to which my improvements pertain to make the traction-band or carrier to extend nearly or wholly the length of the engine-bed. By this means an immense traction force is obtained; but great difficulty is experienced in turning the machine.

To avoid this difficulty I construct the carrier as short as may be found consistent with the traction force required, a sufficient amount of which, for practical purposes, is obtained from a band or carrier much shorter than that usually employed. By making the carrier short the weight of the engine and bed does not, as heretofore, fall altogether or mainly upon it, but in great measure upon the forward guiding-mechanism which I have provided, as hereinafter fully described, and these guiding-wheels are thus also made bearing-wheels, and their leverage or guiding force increased to a great degree of efficiency. The exact length or forward extension of the carrier need not be determined; for the purpose in question I consider the carrier long when the weight of the bed or engine is altogether or mainly supported by the carrier, but short when the relation of carrier and guiding mechanism is such that the weight of the bed or engine is in great measure thrown upon the guiding-wheels.

It is obvious that the shorter the carriage, the less will be the space within which the engine may be turned. In order, therefore, to make the carriage from the rear end of the bed to the front of the guiding-wheels as short as possible, I place the axles of the guiding-wheels in the rear of the forward line of the bed. Where a long carrier is employed, it has been found necessary, in order to obtain sufficient leverage for steering purposes, to locate the guide wheel or wheels in advance of the position which I have indicated, thereby making a large space absolutely necessary for turning. As I have shortened the carrier and, by throwing sufficient weight upon the guiding devices, increased their leverage, this advanced position is not required; the axle may be placed as indicated, and the machine turned within a small space.

In the accompanying drawing illustrating this invention, A represents a bed, which supports the operating machinery required for propulsion. The machine is designed to be run by steam-power, and hence is provided with the boiler B, which supplies the cylinder $B^1$, of which $B^2$ is the piston-rod. The latter is coupled to a pitman, $B^3$, which connects with a crank, *b*, on the end of a shaft supporting a pinion, $b^1$. This pinion engages with a toothed wheel, $b^2$, on another shaft, upon the end of which is a pulley-wheel coupled by a belt with a pulley on the end of a transverse shaft or axle underneath the bed A. This axle holds one of the cam-wheels upon which the endless chain track or carrier travels when the machine is moving. C represents the frame or foundation, to which the cylinder $B^1$ is secured. The carrier is located at the rear of the bed, the guiding-wheels occupying a forward position. The essential component parts of said carrier are the feet D and their connecting-links. The feet consist of transverse bars or ties, arranged to cross a central longitudinal line of the carriage, and to their inner faces are secured stirrups or brackets D′, containing each a friction-wheel, *d*. These stirrups with the wheels are located near the ends of the feet D. The feet are connected by means of a principal chain, composed of large links E and small links E′. Each of the small links consists of two parallel plates, held together by two pins, *e*, and each of the large links consists of a single plate, curled or bent at either end to form eyes for the reception of the pins *e*. Each alternate link of the larger class is secured by bolts or equivalents to the inner face of a foot, thereby allowing one large and two small links of the chain to intervene between every two feet. This construction and arrangement of the chain produces flexibility, and allows the traction-band or carrier to travel with greater ease. Each of the links E has a rectangular projection, *e'*, on its inner face to fit rectangular recesses cut in the cam-wheels, over which said links travel, as hereinafter more fully described.

Besides the chains above described, there are other subordinate chains, of which two are arranged between every alternate two feet. Each of these chains consists of two small links, F, and three large links, F', similar in construction and relative arrangement to those of the large chain. The middle large link and the two small links are between the two feet, while the two end links are secured by bolts or other means to the inner faces of said feet. The carrier, as described, travels over a pair of cam-wheels, G $G^1$, secured to horizontal transverse shafts $G^2$ $G^3$, which have bearings in sockets formed in the ends of longitudinal bars or rails H of a frame secured to the under side of the bed A. The cam-wheels G $G^1$ are of pentagonal form, the sides *g* being adapted to receive the large links E of the principal chain, and the angles $g^2$ notched to receive the small links of the same chain. The sides *g* are formed with recesses of a rectangular form to receive the projections *e'*.

Motion is communicated by the means described to the wheel G, and the carrier, passing over it and over the wheel $G^1$, produces a rotation of the latter. The feet D are thus laid in succession upon the ground, and the machine is thus propelled. In the forward motion of the machine, the feet upon the ground pass rearwardly until their propulsive power is exhausted, when they are carried over the cam-wheels to be again employed.

The length of the chain E E', number of feet, and distance apart of the cams G $G^1$ govern the number of feet upon the ground; but I prefer that the relative arrangement of parts should be such as to let but one shoe at a time be in full contact with the ground, and that as it begins to rise over a cam another foot shall begin to reach the ground. During the motion of the carrier, the friction-rollers *d* travel over the oval bars or rails H.

The guiding mechanism is constructed as follows: Referring to the drawing, I I are two guiding-wheels of large diameter, journaled each to a separate shaft or axle, J, swiveled to the bed in rear of the front line thereof, as already suggested. Said axles are capable of being turned so as to change the position of the wheels. To the inner end of each axle an arm, $I^1$, is pivoted, which arms are in like manner joined to a lever, $I^2$, which turns on a vertical shaft, $I^3$, passing through its center.

The lever $I^2$ obeys the movement of the shaft $I^3$, and by these means the wheels I I are moved to different angles with reference to the sides of the bed A. The shaft $I^3$ is incased by a vertical tube, K, and is furnished with a worm-wheel or pinion, L, at its upper end, which is worked by a worm, $L^2$, journaled to a bracket, $L^3$, which is supported on the top of said tube. The worm may be operated by a hand-wheel, M.

The operation of the machine is simple. Steam being raised, and the power applied by the means described to the cam G, the carrier is set in motion, and the machine propelled over the ground, the direction being governed by the position and movement of the guide-wheels.

Having thus fully described the construction and operation, I claim as my invention, and desire to secure by Letters Patent:

1. In a land-carriage in which the propulsion is accomplished by an endless carrier made with feet which cross a central longitudinal line of the carriage, I claim constructing the carrier short, as described, for the better guidance of the machine, as set forth.

2. In a land-carriage constructed with a short carrier, for the purposes described, I claim the employment of guiding mechanism, substantially as set forth, or equivalent.

3. In a land-carriage propelled by an endless carrier, I claim the arrangement of the axle of the guiding mechanism in the rear of the front line of the carriage.

4. In a land-carriage in which the propulsion is accomplished by an endless carrier made with feet constructed to cross a central longitudinal line of the carriage, I claim guiding bearing-wheels.

5. The steering apparatus, consisting of the wheels I I, having independent axles, the lever $I^2$, shaft $I^3$, toothed wheel L, and worm $L^2$, substantially as specified.

6. The endless shoe-bearing band for traction-engines, consisting of the short side plates E', the pivot-bolts *e*, and the long links E, encircling at each end said bolts *e*, substantially as specified.

In testimony that I claim the above I have hereunto subscribed my name in the presence of two witnesses.

ROBERT C. PARVIN.

Attest:
CHAS. JENNINGS,
HARRY C. WOODWARD.